Figure 2:
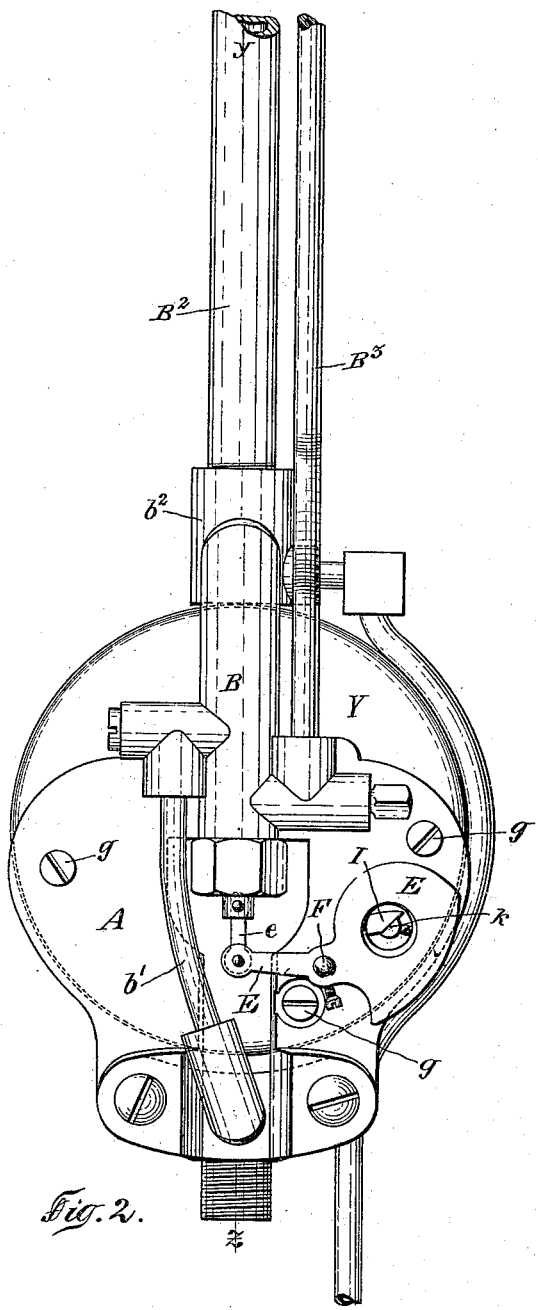

No. 639,166. Patented Dec. 12, 1899.
J. FROSSARD.
TIME LAMPLIGHTER.
(Application filed Aug. 20, 1898.)
(No Model.) 4 Sheets—Sheet 1.
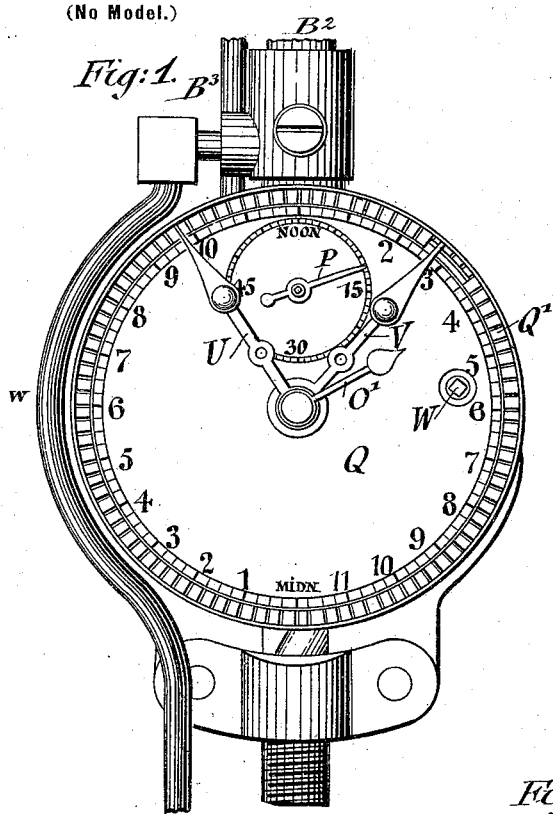
Fig: 1.
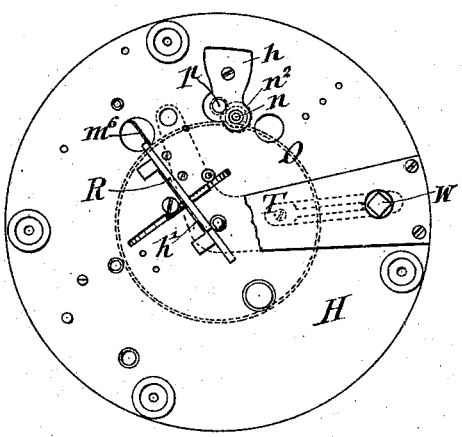
Fig: 12.
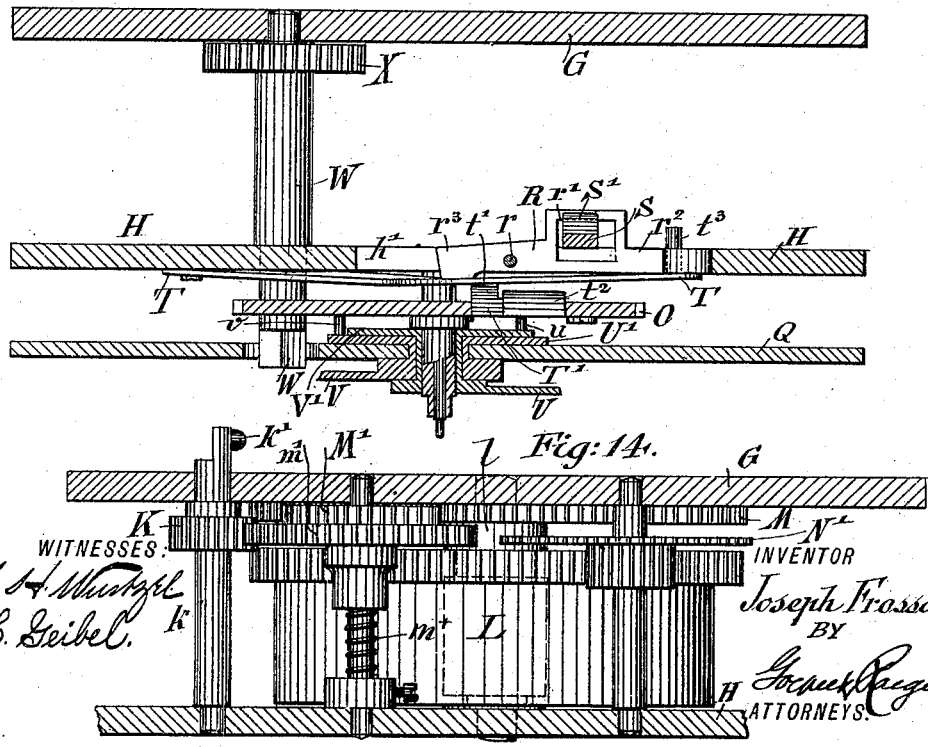
Fig: 13.
Fig: 14.
WITNESSES
INVENTOR
Joseph Frossard
BY
ATTORNEYS.

No. 639,166. Patented Dec. 12, 1899.
J. FROSSARD.
TIME LAMPLIGHTER.
(Application filed Aug. 20, 1898.)
(No Model.) 4 Sheets—Sheet 2.

WITNESSES:

INVENTOR
Joseph Frossard
BY
ATTORNEYS.

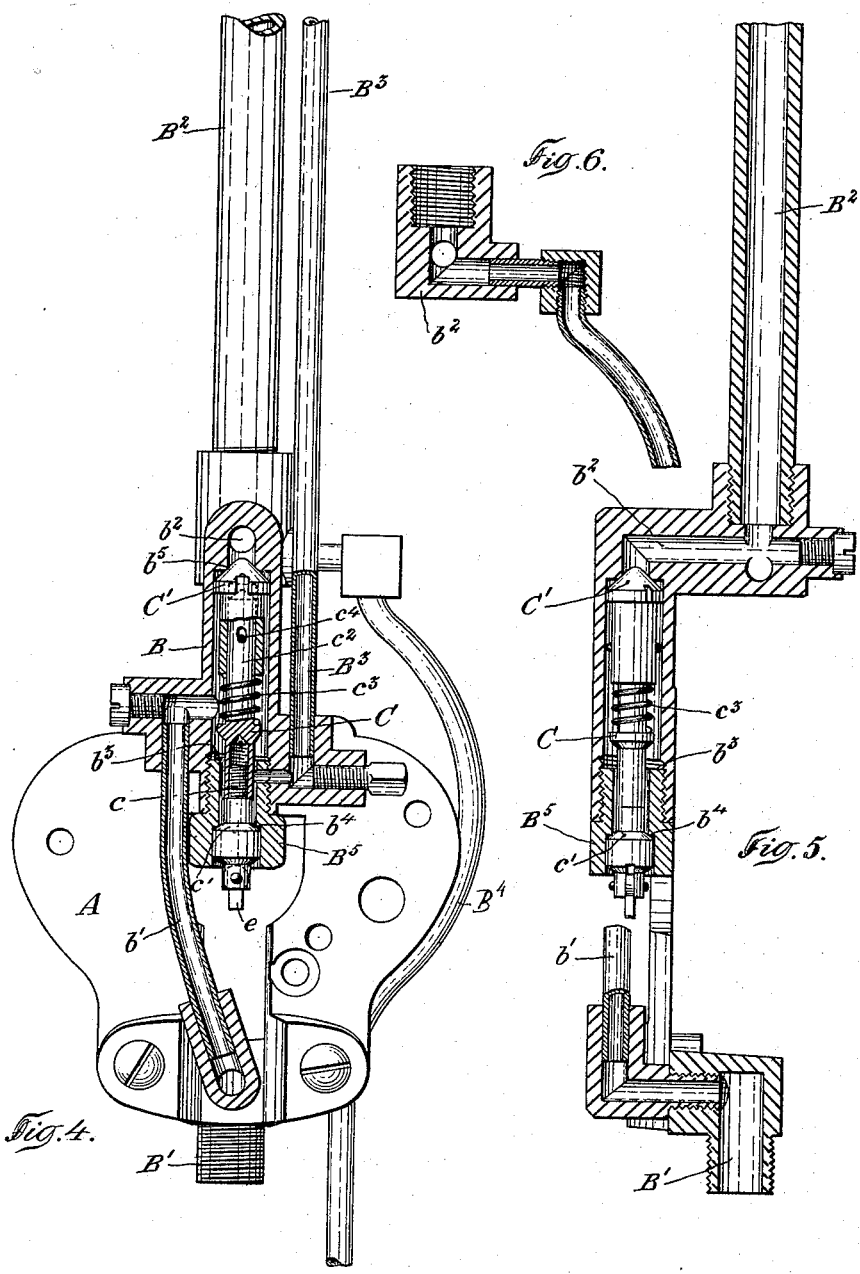

No. 639,166. Patented Dec. 12, 1899.
J. FROSSARD.
TIME LAMPLIGHTER.
(Application filed Aug. 20, 1898.)
(No Model.) 4 Sheets—Sheet 4.

WITNESSES:
M. Henry Nintzel
Karl Koelle

INVENTOR
Joseph Frossard
BY
ATTORNEYS.

THE NORRIS PETERS CO., PHOTO-LITHO., WASHINGTON, D. C.

United States Patent Office.

JOSEPH FROSSARD, OF PORRENTRUY, SWITZERLAND, ASSIGNOR TO BERNHARD RÜND, OF ZURICH, SWITZERLAND.

TIME LAMPLIGHTER.

SPECIFICATION forming part of Letters Patent No. 639,166, dated December 12, 1899.

Application filed August 20, 1898. Serial No. 689,113. (No model.)

*To all whom it may concern:*

Be it known that I, JOSEPH FROSSARD, manufacturer, a citizen of the Republic of Switzerland, residing at Porrentruy, Switzerland, have invented certain new and useful Improvements in Apparatus for Lighting and Extinguishing Gas-Jets, of which the following is a specification.

One object of the present invention is to do away with the manual work involved by the lighting and extinguishing of gas-jets, such as those in street-lamps, intended to burn for a predetermined number of hours.

Another object of the invention is to attain an accuracy in the time of lighting or extinguishing which could not possibly be obtained by a workman, as it is quite impossible for him to be at the same time within reach of all the apparatus which are committed to his care.

This invention comprises the combination of a time mechanism with a device intended to cut off the source of light and with a mechanism acting upon the latter at predetermined hours.

The apparatus comprises an inlet-pipe for the gas and a feed or supply pipe on which the burner is secured. A small lighting-pipe is provided for supplying the auxiliary burner or pilot-light with gas, the said pilot-light burning only in the daytime.

The invention consists in connecting or disconnecting alternately at fixed hours the inlet and feed pipes and in connecting at other times the feed-pipe and the pilot-pipe. This is done by means of a double-seat valve connected with a valve-operating lever acted upon by means of a mechanism secured to a vertical supporting-plate. The said plate carries, on the one hand, by means of suitable pillars or distance-pieces, other plates and bridges, besides a dial and a case with a suitable clockwork, and, on the other hand, a pivoted rocking-lever, connected to the said double-seat valve and acted upon by one of the gears of the said clockwork.

The obturator is composed of the aforesaid double-seat valve, located in a case inserted between the inlet and feed pipes. The lower valve proper of this double-seat valve is screwed thoroughly on a pin. The upper valve is loosely fitted on the rod of the lower valve, and a spiral spring is provided between them, surrounding the said rod and tending to keep the valves apart. A screw secured to the upper valve and engaging into a notch of the rod of the lower valve is intended to limit the relative play of both valves. The upper valve is guided in the casing. It is intended to prevent the gas from passing from the inlet-tube into the feed-tube through holes in the valve-casing. The lower valve is guided by its lower hollow stem through a hole in the screw-cap of the casing, the escape of the gas through the opening being prevented by either of two conical portions of the said stems alternately bearing on either of two conical seats provided in the said screw-cap, the one above and the other one below the lateral opening corresponding with the pilot-tube.

In view of having the invention the better understood I will now proceed to describe the same with reference to the accompanying drawings, making a part of the present application for patent.

Figure 3:
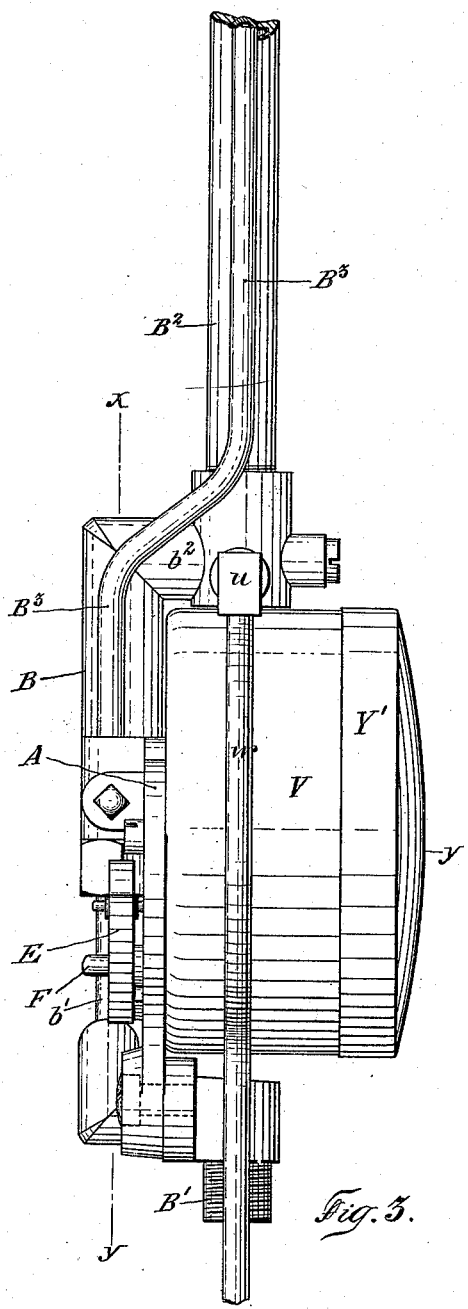
Figure 8:
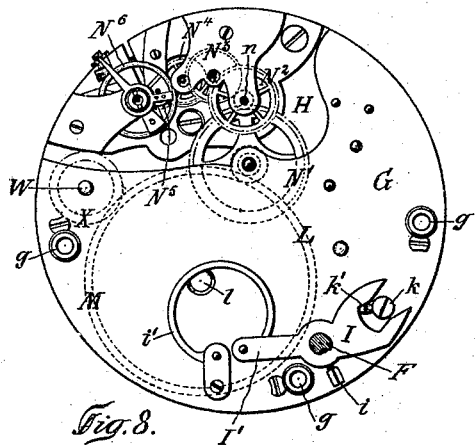
Figure 9:
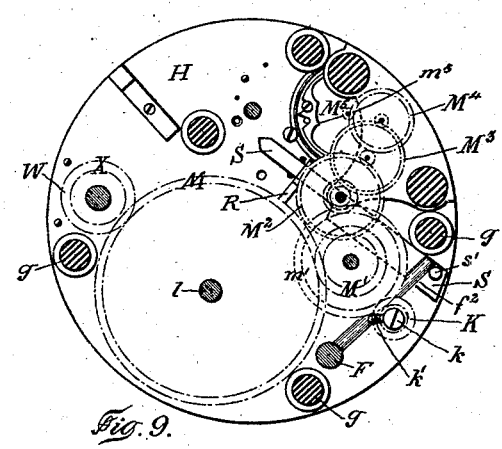
Figure 15:
Figure 11:
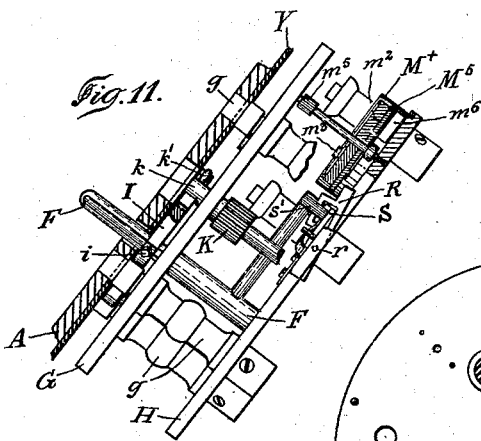
Figure 16:
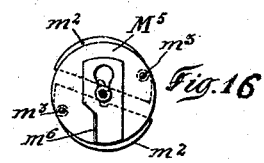
Figure 10:
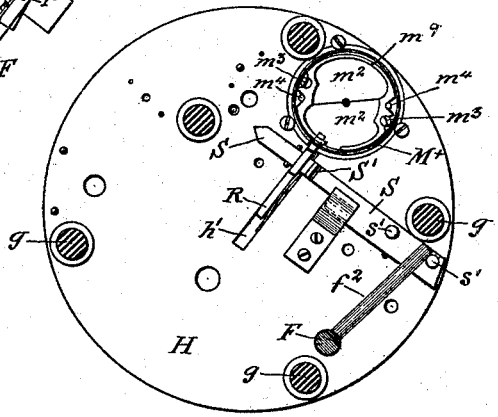
Figure 7:
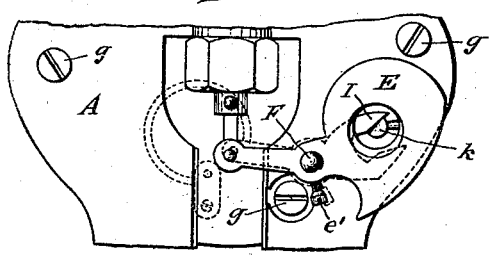

In the drawings, Figure 1 is a front elevation of the improved apparatus. Fig. 2 is a back elevation of the same. Fig. 3 is a side elevation of the same. Fig. 4 is a back elevation of part of the apparatus with a section through the line $x\ y$ of Fig. 3. Fig. 5 shows a section of the tubes on the line $y\ z$ of Fig. 2. Fig. 6 is a section of the tubes on the line $u\ w$ of Fig. 3. Fig. 7 shows a portion of the apparatus, explaining the connection of the external lever with the internal anchor device acting upon the same. Fig. 8 is a top view of the clockwork. Fig. 9 is a similar top view after the withdrawal of some portions of the work. Fig. 10 is a similar top view after the withdrawal of some further portions of the works. Fig. 11 is a side elevation with a partial section of the parts shown in the last figure. Fig. 12 is a plan view of the parts of the clockwork situated under the dial. Fig. 13 is an enlarged cross-section of the same and of the dial and hands in different position to Fig. 11. Fig. 14 is a side elevation of some portions of the gearing. Figs. 15 and 16 show detached portions of the clockwork, which will be fully described below.

In all the figures the same letters refer to the same parts.

A is a frame or plate to which are fixed on the one side the valve-casing and connecting-tubes and on the other side the clockwork.

B is the casing of the double-seat valve, Figs. 4 and 5. The said casing B is connected by means of a pipe $b'$ with the inlet-pipe B' and by means of an elbow-pipe $b^2$ to the feed or supply pipe $B^2$, on which the burner is secured in the usual way. The casing B is further connected with the small lighting-pipe $B^3$, supplying the auxiliary burner or pilot-light with gas when the double-seat valve is in a certain position, as will be described below. A pipe $B^4$ connects the elbow-pipe $b^2$ with the usual secondary pipe of the lamp-cock, which when in use with the present invention will normally shut the said pipe $B^4$. Should it be necessary for any reason whatever to temporarily withdraw the apparatus forming the subject of the present invention, the said cock would be turned, so as to shut the pipe B' and to open the pipe $B^4$.

The double-seat valve is formed of a lower portion C, screwed on a pin $c$. The said valve C is intended to bear upon its seat $b^3$ in view of preventing the escape of gas coming from the inlet-pipe B' through the inner portion of the casing B to the pilot-pipe $B^3$ when the upper portion C' of the valve is open, and the pin $c$ has a conical portion $c'$, which is intended to bear upon a seat $b^4$, formed in the screw-cap $B^5$, in view of preventing the escape of gas out of the said cap $B^5$ whenever the lower portion C of the double-seat valve is open, as shown in Fig. 4.

The upper portion C' of the double-seat valve is loosely fitted on the rod $c^2$ of the lower portion of the same, and a spiral spring $c^3$ is provided between them, surrounding the said rod and tending to keep the valves apart. A screw $c^4$, secured to the said stem and engaging into a slot of the upper valve, is intended to limit the relative play of both valves.

In the position of the parts illustrated in Fig. 4 of the drawings the double-seat valve is pressed upward, and this causes the upper valve C' to be pressed on its seat $b^5$ and the cone $c'$ of the rod $c$ to be pressed on its seat $b^4$, while the lower valve C is disconnected from its seat $b^3$. It therefore appears that the gas entering the casing B through the inlet-pipe B' can escape neither into the supply-pipe $B^2$ nor out of the axial hole of the screw-cap $B^5$; but the said gas is free to escape into the pilot-burner pipe $B^3$ as long as the parts remain in the described position. Now, as is shown in Figs. 2, 3, and 7, the rod $c$ of the lower valve C is connected by means of a connecting-rod $e$ to a rocking lever E, fixed by means of a screw $e'$ to an axis F, projecting through the plate A and the clockwork lodged between the plates G and H. The said plates G and H are connected with one another and with the frame or plate A by means of suitable pillars $g$, and the axis F bears between the said plates A and G an anchor-lever I, fixed to the same by means of a screw $i$ and having a projecting arm I', connected to a spring $i'$, Fig. 8, fixed to the plate G and intended to cause the rocking motion of the said anchor-lever I, which will be described below, to take place at a jump, the said spring $i'$ tending to force always the anchor-lever I into one of its extreme positions, which involve the two extreme positions of the rocking lever E—that is to say, either in a position of the said lever E in which it presses the double-seat lever to top, opening the valve C and shutting the valves C' and $c'$, or in a position of said lever E in which it presses the said double-seat valve down, opening the valve C' and shutting the valve C.

The anchor-lever I engages its forked arm with the projecting end of the axis $k$ of a pinion K, which is lodged between the plates G and H, and the said projecting end of the axis $k$ has a projecting nose $k'$, which causes the said forked arm of the lever I to be alternately thrown to and fro when the axis $k$ is rotated. Now the pinion K is alternately rotated and stopped by means of a clockwork provided with suitable starting and stopping devices, which I will now proceed to describe with reference to Figs. 7 to 14 of the drawings. Between the plates G and H there is first provided a mainspring-barrel L. The one end of the mainspring contained in the barrel L is attached to the said barrel, the teeth of which act upon a clockwork of usual system. The same is composed of a first wheel N', second wheel $N^2$, third wheel $N^3$, fourth wheel $N^4$, escapement-wheel $N^5$, and balance-wheel $N^6$. The axis $n$ of the wheel $N^2$ projects through the plate H and is pivoted in a bridge $h$, fixed on the outer face of the same, Fig. 12. The said axis $n$ bears a pinion which engages a center wheel O, which will be described below. The toothed wheel and escapement of the clockwork just described are suitably combined, so as to cause the center wheel O to perform one revolution in twenty-four hours. The axis of the said wheel O bears a hand O', which marks the hours on a concentric division of the dial Q, numbered from "0" to "12," on each half of its periphery, so as to indicate the hours from noon to midnight and from midnight to noon. The axis $n$ further bears a wheel $n^2$, engaging a pinion $p$, the axis of which projects through the dial Q and bears a small hand P, marking the minutes on a smaller dial on the dial Q. The inner end of the mainspring contained in the barrel L is attached to the axis $l$ of the same, to which is affixed a wheel M, which gears with the intermediate wheel M'. The wheel M further gears with a winding-up wheel X, the axis W of which projects through the dial Q and is provided with a square end, so as to be engaged by a suitable key for winding up the mainspring. The axis of the wheel M' bears a loose wheel $m'$, which is connected to the wheel M' by means of a spring $m^\times$ and click-teeth connection $m^3$, allowing the said wheel M' to be rotated in one direction without the loose wheel $m'$ for the purpose of winding up the mainspring, but causing the said loose wheel $m'$ to be withdrawn with the wheel M' when the latter is rotating in the inverse direction. The loose wheel $m'$ engages the above-mentioned pinion K, the axis $k$ of which bears the nose or projection $k'$, acting upon the forked arm of the anchor-lever I. At every half-rotation of the axis $k$ the nose $k'$ of the same acts upon one of the branches of the said forked arm of the anchor-lever I, causing thereby the latter to be rocked from one of its extreme positions in the other one, and causing thereby the lever E to be rocked and to throw the double-seat valve either to top or to depress the same into its lowest position. The loose wheel $m'$ further gears with the pinion of a wheel $M^2$, which drives the pinion of a wheel $M^3$, gearing with the pinion of the wheel $M^4$, driving the arbor $m^5$ of a fly-regulator $M^5$. The same consists of a disk $M^5$, fixed to the arbor $m^5$, and to which are eccentrically pivoted two wings $m^2$ by means of the screws $m^3$. The said wings $m^2$ are provided each with a projection $m^4$, engaging with a spring $m^9$, Fig. 10, which is held in its place by means of the heads of the screws $m^3$. When at rest, the said spring $m^9$ tends to maintain the wings $m^2$ applied the one against the other, as shown in Fig. 10; but when the disk $M^5$ is rotated with a certain speed then the centrifugal force throws the wings $m^2$ outward, Fig. 16, the pins $m^4$ compressing the spring $m^9$. This whole device is lodged within a cylindrical box $M^\times$, fixed to the plate H, and whenever the wings $m^2$ are thrown outward, as just specified, they are caused to engage with the inner walls of the said fixed box, and thereby a friction is produced which is more or less intense, according to the speed of the disk $M^5$. This device acts, therefore, as a very intense brake-regulator upon the whole train of wheels M, M', $m'$, $M^2$, $M^3$, and $M^4$. The disk $M^5$ is further provided with a suitable radial projection $m^6$, which is intended to engage the rocking lever R, pivoted at $r$ to the plate H and liable to be rocked perpendicularly to the said plate H in a slot $h'$, by which it is engaged with smooth friction, so as to keep always the position in which it has just been rocked. Now the said rocking lever R is provided with an opening $r'$, through which is passed a sliding bolt S, capable of being longitudinally slid on the plate H and provided with a projecting nose S' and with two projecting pins $s'$. The said projecting nose S' is formed of two inclines and is intended to throw the rocking lever R into the position shown in Fig. 13 whenever the sliding bolt S is slid in either direction from one of its extreme positions to the other one, whereby the nose S', being forced through the said opening $r'$ of the lever R, lifts the latter into the position shown, in which it remains until the action of the pin $u$ or $v$, lifting the center wheel O and the spring T, acts upon the end $r^3$ of said lever R and projects the same into the position shown. This sliding of the bolt S is caused by means of a radial arm $f^2$, projecting from the axis F between the two pins $s'$, and therefore it will easily be understood that the to-and-fro sliding of the bolt S will take place at same time as the rocking of the lever E—that is to say, at same time as the up or down motion of the double-seat valve C C'. Each sliding of the bolt S causes the rocking lever R to take the stopping position shown in Fig. 11, in which the one end $r^2$ of the same is within the path of the radial projection $m^6$ of the disk $M^5$ and in which it stops the rotation of the latter. The inverse rocking of the lever R is caused by depressing the spring T, Figs. 12 and 13, which bears upon the end $r^3$ of the said lever R, and the depressing of the spring T is caused by means of a rocker T', pivoted in a suitable opening of the above-mentioned center wheel O and provided on the one side with a projecting edge $t'$, intended to act upon the said spring T, and on the other side with a projecting edge $t^2$, intended to be acted upon by the pins $u$ and $v$ of the disks U' and V', to which are fixed the hands U and V, (see Fig. 13,) which one sets upon the hours at which the gas-jets are to be lighted or extinguished. The dial Q is surrounded by a notched circle Q', in view of securing the hands U and V in the desired position.

It is necessary that when the spring T is depressed by the action of the pins $u$ or $v$ upon the rocker T' the fly-regulator $M^5$ remain stopped until the said pin $u$ or $v$ is disengaged from the said rocker T'. According to the slow rotation of the wheel O the lifting of the rocking lever R from its position shown in Fig. 11 to its position shown in Fig. 13 is rather slow, and therefore the starting of the fly-wheel might be inexact. To avoid this, the spring T is provided with a projection $t^3$, which engages the projection $m^6$ of the disk $M^5$ whenever the action of the pins $u$ and $v$ lifts the wheel O and spring T into the position shown and remains engaged until the rocker T' is disengaged from the pin $u$ or $v$. Then the spring T throws the wheel O into the position shown and the pin $t^3$ is suddenly thrown out of the path of the said projection $m^6$ of the fly-regulator, which is then free.

The whole clockwork is surrounded by a casing Y, the bottom of which is inserted between the pillars $g$ and the plate A and which is closed by means of a cover Y', provided with a glass $y$.

The described apparatus will play as follows: The mainspring being wound up, the clockwork, composed of the gears N' to $N^6$, will continuously go and cause the hand O' to mark the hours and the hand P to mark the minutes. The hands U and V are then placed upon the time at which one wishes to have the gas-jet lighted (between noon and midnight) and extinguished, (between midnight and noon.) This will determine the moments at which the rocker T', rotating with the hour-wheel O, shall successively be acted upon by the pins $u$ and $v$ of the hands U and V. Until this occurs the rocking lever R remains in the position shown in Fig. 11, in which it has been placed by a precedent action. Now if one of the pins $u$ or $v$ depresses the rocker T' the latter depresses in turn the spring T and the end $r^3$ of the lever R. The end $r^2$ of the same is then put out of reach of the projection $m^6$ of the fly-regulator $M^5$, as shown in Fig. 13, and the latter begins to rotate, but is immediately stopped again by the pin $t^3$ of the spring T until the latter is allowed by the rocker T', bearing the pin $u$ or $v$, to be lifted again into the position shown in Fig. 11. Then the regulator $M^5$ is free to rotate with the whole train of wheels M' $m'$ $M^2$ $M^3$ $M^4$ $m^5$, and the wheel $m'$ at the same time rotates the pinion K and the nose or projection $k'$ of its axis $k$. This causes, after half a revolution of the axis $k$, the anchor-lever I and rocking lever E (which we will suppose to actually be in their positions shown in Figs. 2 and 7, corresponding to the position of the valve shown in Fig. 4) to be rocked into their opposite positions, corresponding to the opening of the upper valve $C^7$ and shutting of the lower valve C. The gas is then no more allowed to escape into the pilot-pipe $B^3$; but it is free to escape into the supply-pipe $B^2$, bearing the burner. At same time the arm $f^2$ throws the bolt S from one of its extreme positions to the other, and the nose S' throws thereby the rocking lever R back to its position shown in Fig. 13, in which it stops the fly-regulator $M^5$, and thus the whole train of wheels M' to $M^5$. The parts remain then in the same position until the other of the pins $u$ or $v$ is struck by the rocker T' and causes the same actions to take place again and the double-seat valve to be moved in the inverse sense, bringing the same again into the position shown in Fig. 4, in which the gas is not allowed to escape to the supply-pipe $B^2$, but only to the pilot-pipe $B^3$.

Having thus fully described my invention, I claim—

1. In apparatus for lighting and extinguishing gas-jets, the combination of a starting and stopping device, comprising hands U and V, disks U' and V' therefor provided with projections $u$ and $v$, a dial Q having a circular series of notches, for preventing the accidental displacement of the hands, an hour-wheel O, and a rocker T' pivoted in a recess of the latter, and provided with projections $t'$ and $t^2$, the former being adapted to act upon the starting and stopping lever, and the latter being acted upon by said projections $u$ and $v$, substantially as set forth.

2. An apparatus for lighting and extinguishing gas-jets, comprising an inlet-pipe B', a valve-casing B, a connecting-pipe $b'$, supply-pipe $B^2$, elbow connections between the inlet-pipe B' and the connecting-pipe $b'$, and the valve-casing B and the supply-pipe $B^2$, whereby the valve-casing is set back or offset from the pipes B' and $B^2$, a plate or frame mounted on the inlet-pipe, and arranged between said elbow connections, the works-containing box Y supported on the said frame between said elbow connections, time mechanism contained in said box, a double valve in said valve-casing, and suitable connections between the valve and time mechanism, substantially as set forth.

In testimony that I claim the foregoing as my invention I have signed my name in presence of two subscribing witnesses.

JOSEPH FROSSARD. [L. S.]

Witnesses:
E. MIER SCHNEIDER,
TH. MERL.